March 2, 1965 F. P. SPINELLI ETAL 3,172,020
CURRENT-CONTROLLING CIRCUIT FOR DIRECT-CURRENT
ELECTROMAGNETIC DEVICES
Filed Feb. 12, 1962 2 Sheets-Sheet 1
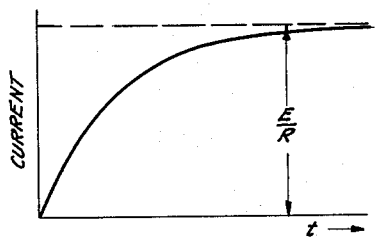
FIG. 1
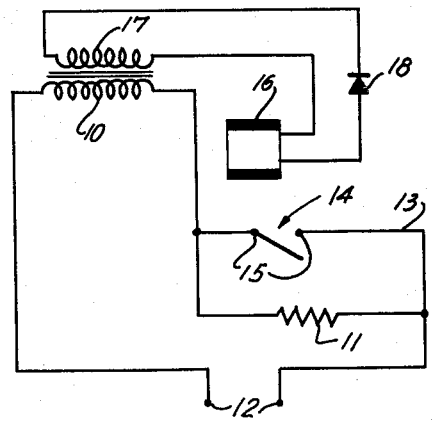
FIG. 6
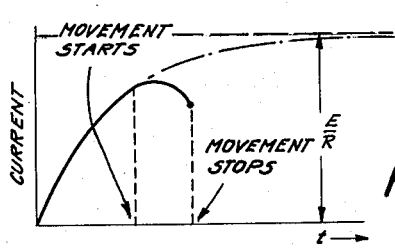
FIG. 2
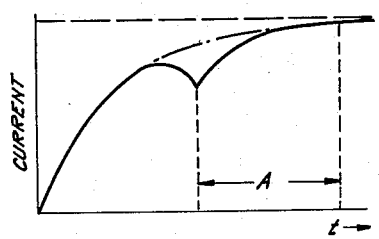
FIG. 3
FIG. 7
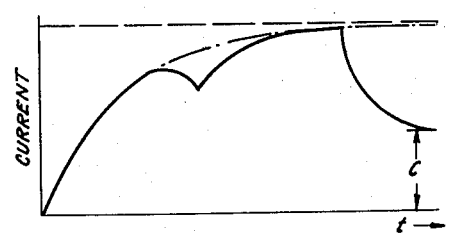
FIG. 4
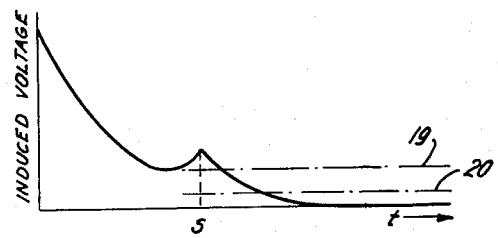
FIG. 5
INVENTORS:
FRANK P. SPINELLI
FRANK S. NOLT
BY
Frederick Breitenfeld
ATTORNEY

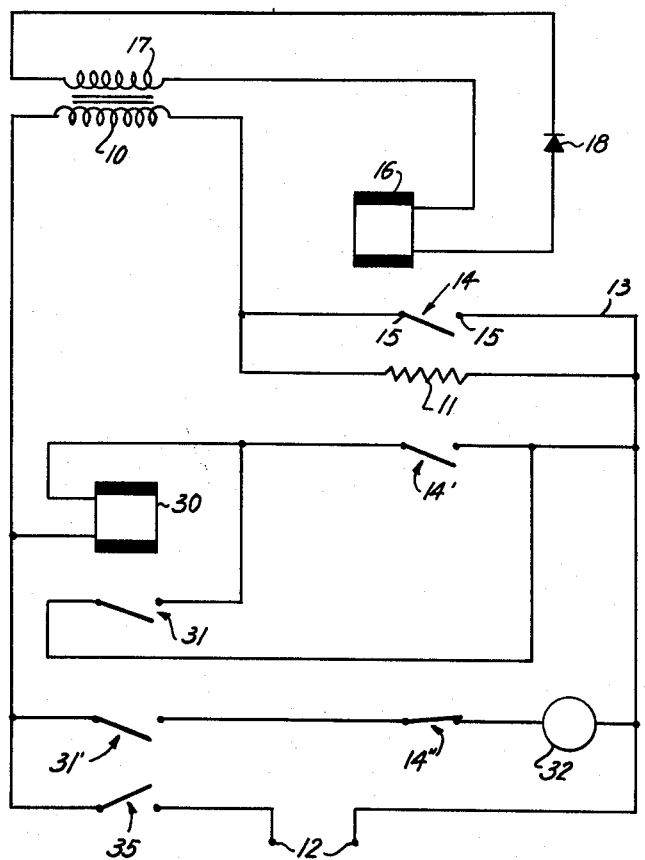

3,172,020
CURRENT-CONTROLLING CIRCUIT FOR DIRECT-CURRENT ELECTROMAGNETIC DEVICES
Frank P. Spinelli, Teaneck, and Frank S. Nolt, Denville, N.J., assignors to Automatic Switch Co., Florham Park, N.J., a corporation of New York
Filed Feb. 12, 1962, Ser. No. 172,486
5 Claims. (Cl. 317—155.5)

This invention relates generally to direct-current electromagnetic devices, and has particular reference to devices of the type in which the movements of an armature or other element are controlled, at least in part, by the current flowing through a coil or winding.

An example of such a device is a direct-current solenoid, in which the energizing and de-energizing of a coil controls the movement, in an axial direction, of a core or armature concentrically mounted within the winding. Although some of the features of the invention will be described in relation to such an electromagnetic device, it will be understood that the basic nature and purpose of the invention have a wider applicability.

The force exerted by an electromagnetic device upon its armature is directly proportional to the square of the magnetic flux density. Obviously this force becomes greater as the air gap decreases to zero. In fact, after the armature has reached its seated position (air gap zero) the force is much greater than necessary to maintain the armature in its seated condition. Therefore it is desirable to control the operation in such a way that there is temporarily increased flux at the time of energization, while the flux at other times is maintained at a substantially reduced value. Flux varies with the ampereturns, hence several methods have heretofore been employed to reduce the ampere-turns value (by series resistance or tapped windings) after the armature has completed its stroke. These expedients have not been entirely satisfactory.

It is an object of this invention to provide an improved, more efficient, more reliable electric circuit for controlling the operation of such a device. More particularly, the invention provides a novel and thoroughly practicable means for automatically increasing the magnetic pulling power of the winding of the device when it is most needed, viz., when the movement of the armature is to be initiated, and for automatically reducing the pulling power when it is no longer needed nor desirable, viz., after the armature has completed its stroke. Stated otherwise, the energy consumed during activation of the device is temporarily increased beyond the normal value thereafter required. Thus, the following advantages are achieved with the present circuit:

(1) Unnecessary power consumption by the winding of the device after seating of the armature is prevented;

(2) The usual thermal rise in the device is minimized due to the reduction in power consumption;

(3) The work capacity of a solenoid of given physical size is enlarged, or put another way, for a specified amount of work a solenoid of reduced size and weight can be used.

Other advantages in addition to the above are also achieved. Where an arrangement of prior art is employed, the reduction in ampere turns will occur at an air gap greater than zero. However, when the present circuit is employed, since ampere turns are reduced after the armature has seated a greater reduction in ampere turns is possible. This will reduce the heating of the winding and will extend the repetitive rate of operation of the solenoid.

In addition, characteristic of a direct current solenoid is the fact that the fewer the number of turns in the winding, the more rapidly the armature operates since with fewer turns the current and thereby the flux builds up more rapidly. When the present circuit is employed, the solenoid need have fewer turns than usual since it is required to carry only a reduced current when the armature is seated. Thus the operating time of the solenoid is substantially reduced.

The present invention presents a further advantage over prior art due to the "fail-safe" arrangement of the circuit. The current limiting resistance in this circuit is always in series with the winding of the solenoid except for the short interval of current build-up in the winding. Hence even at full line voltage, if the armature is restrained from motion, the winding cannot overheat.

It is a further object of the invention to provide a circuit including a signal adapted to be energized whenever the moving armature comes to rest.

One of the simplest ways to reduce current consumption during holding periods, and momentarily to increase it only during the short periods in which armature movement is initiated, is to arrange a resistance in series with the main winding of the device, and to bypass it when full voltage is to be made effective. Circuits heretofore proposed control the establishment of the short-circuiting bypass by a switch actuated by the movable armature of the electromagnetic device. Such circuits have serious shortcomings, since they are susceptible to overheating and possibly costly burn-out under adverse conditions. In such a system, for example, the "break" distance of the switch contacts may necessitate introduction of the resistance prior to completion of core movement, i.e., at some point undesirably short of its fully seated position; or the mechanical nature of the device may not permit the most desirable positioning of the switch contacts. In either case, the premature introduction of the resistance decreases the current before the stroke has been completed, often inducing a sustained vibration or stutter of the core movement, especially at lower applied voltages. Should the fluttering come to a stop with the switch contacts in a position excluding the resistance from the circuit, a dangerous overheating may occur.

These and other shortcomings of such arrangements are overcome by the present invention, which is predicated upon a theoretical as well as a practical study of the complex electromagnetic phenomena involved in passing direct current through a winding whose electromagnetic properties are altered, from moment to moment, by the movement of an armature in magnetically coupled relation to it.

A feature of the invention resides in the provision of a circuit which allows maximum current flow during energization and advantageously automatically reduces it under the following conditions:

(a) If the armature completes its full stroke, the current flow is reduced only at a time that is definitely subsequent to armature seating;

(b) Whenever the armature comes to rest, in the event that it is prevented from completing its stroke; and (c) In any case, without reliance upon mechanical actuation of switch contacts or other apparatus by the armature itself.

In accordance with this invention, the attainment of the desired results involves the provision of a special auxiliary circuit for cutting in, or by-passing, a resistance in series with the main winding. The auxiliary circuit includes a switch, or a transistor or other device serving an equivalent function, and a control winding inductively coupled with the main winding of the electromagnetic device. The switch is designed and arranged to be responsive to current flowing in one direction in the control winding. Thus, whenever there is a changing flux in the environment of the main winding there is an induced switch-controlling voltage in the control winding, and whenever the flux of the main winding stops changing, the effective current in the control winding stops also. The functioning of the circuit does not rely in any way upon the kinetic energy of the movable armature itself.

Several embodiments of the invention, whereby the objectives and advantages of the invention may be achieved, are illustrated by way of example in the accompanying drawings, in which—

FIGS. 1-4 are explanatory graphs depicting certain transient current changes to be referred to hereinafter;

FIG. 5 is a similar graph depicting certain induced voltage changes;

FIG. 6 is a schematic diagram of an electromagnetic device provided with the improved control circuit, the movable armature being omitted;

FIG. 7 is a diagram similar to FIG. 6, illustrating a modified arrangement; and

FIG. 8 is a diagram similar to FIG. 6 including a signal device for indicating when the movable armature comes to rest.

Referring first to FIGS. 1-3, it should be noted at the outset that the transient direct-current flow in an inductive load, when a selected direct-current voltage is applied to it, follows an exponential rise expressed by the equation (1) $$I = \frac{E}{R} - \frac{E}{R} e^{-\frac{R}{L}t}$$

where I is the current, E the voltage, R the resistance, L the inductance, $t$ the elapsed time, and $e$ the base of the Napierian system of logarithms. The rise of current may be represented by the curve shown in FIG. 1, from which it will be observed that, as expected, the current approaches $E/R$ asymptotically.

During the rise in the current value the current flowing at any instant is not determined solely by the applied voltage V, as in a purely resistive circuit, but by the applied voltage less the induced voltage opposing it. It can be shown that the induced voltage follows a falling exponential curve according to the equation (2) $$E \text{ (induced)} = Ee^{-\frac{R}{L}t}$$

This discussion presupposes that the inductive load remains unaffected by movements of an element magnetically coupled to it, i.e., its reluctance remains constant. If the reluctance changes, as it does if the lines of flux are cut by such a moving element and if the moving element is part of the flux path and reduces an air gap as it moves, the transient current flow deviates from that of FIG. 1. The reluctance decreases with decrease in length of the air gap in advance of the moving element, and as a result the flux rises at an increasing rate, thus progressively increasing the induced voltage opposing the change. This progressively reduces the current flow, and as a result the curve appears as in FIG. 2. It will be noted that the current starts to decrease its rate of growth when the core or armature or other moving element starts to move. This phenomenon continues to a degree at which the absolute current value suffers a decrease, and ends only when the armature has come to rest. During the period of current decrease, the flux nevertheless continues to rise because of the progressively decreasing air gap.

After the armature has stopped moving, the current level rises again, responding to the static-condition Equation 1, as indicated in FIG. 3.

By means of the improved control circuit, unreliable mechanical operations are dispensed with, and a means is provided whereby the desired resistance is reliably introduced into the circuit of the main winding *after* the core or armature of the electromagnetic device has completed its contemplated stroke and has come to a halt in its fully seated end position. The achievement of this result is based upon a recognition of the fact that there is a continuing flux change from the moment the activating voltage is applied, throughout the entire period of movement of the armature or other element, and for an appreciable time interval thereafter (the interval indicated at "A" in FIG. 3). By harnessing this changing flux to a switch controlling function, such as by means of a relay, the desired resistance can be caused to be automatically introduced at a time reliably subsequent to a full completion of the desired movement of the armature. More particularly, it is the cessation of the flux change, or more correctly the reduction of the flux change below the minimum required to hold in the relay, which is caused to actuate a switch to introduce the desired current-limiting resistance, and this has the added advantage that the current is automatically cut in the event that the core is obstructed or is for some other reason prevented from completing its stroke.

In the embodiment of the invention depicted in FIG. 6, the main winding of the electromagnetic device is indicated at 10. It is magnetically coupled in known fashion with a movable armature or element (not shown) which forms part of the flux path and moves from one position to another under the magnetic influence of the winding 10 when operating voltage is applied. In series with the winding 10 is a resistance 11 and a source of direct-current voltage 12. A shunt or by-pass 13 is arranged across the resistance 11, and it includes a switch 14 comprising relatively movable contacts 15. In the arrangement chosen for illustration, when the contacts 15 come together the resistance 11 is short-circuited. This is the condition which exists during energization of the device, whereby maximum available current flows through the main winding 10. When the contacts 15 open, the resistance is introduced in series with the winding 10 and cuts the current flow. This is the condition which exists (*a*) when the movable element of the device has reached its rest position after full completion of its stroke, and also (*b*) whenever the movable element of the device has come to a stop somewhere short of the desired full-stroke movement.

In FIG. 6 the switch 14 is actuated by a relay, i.e., the contacts 15 are influenced by the energizing of a relay coil 16. This coil is in series with a control winding 17 arranged in inductively coupled relation to the main winding 10. To limit the effectiveness of the winding 17 to current flowing only in one direction a rectifier 18 is interposed in the circuit of winding 17 and relay coil 16.

The operation is as follows:

Upon application of voltage at 12, current rises in winding 10 in accordance with the curve shown in FIG. 3. Voltage induced in the control winding 17 follows a reverse curve as shown in FIG. 5. The relay coil 16 is so designed, and suitably polarized, that it will "pick up," i.e., it will close contacts 15, at all voltages above the value depicted by the line 19 in FIG. 5. Therefore the resistance 11 is by-passed during the entire period of movement of the armature which is magnetically drawn by the winding 10, and for an appreciable period thereafter. As hereinbefore explained, such movement comes to an end at the time indicated at "S." The relay coil 16 is designed to "drop out," i.e., release and re-open contacts 15, and thus restore the resistance 11 into series with the winding 10, at any suitable low voltage below the value 19, as for example at the voltage indicated at 20. Upon drop-out, a reverse voltage may be momentarily induced in the control winding 17, but the rectifier valve 18 prevents the resultant current from causing undesired reactivation of relay coil 16.

The effect of this operation upon the current flowing in the main winding 10 is depicted in FIG. 4. When the relay 16 drops out and the resistance 11 becomes effective the magnitude of the current in winding 10 drops exponentially to the reduced value "C" and remains at that value during the continued functioning of the electromagnetic device in its energized condition.

In the embodiment of the invention shown in FIG. 7, the main winding 10, resistance 11, voltage source 12, and inductively coupled control winding 17 are the same as in FIG. 6. The operation is in this case essentially the same, except that the switching device 22 that controls the by-passing of the resistance 11 is a transistor rather than a relay-controlled switch. The collector 23 and the emitter 24 lead in known fashion to the base 25. The base circuit performs somewhat the same function as the relay coil 16 of FIG. 5, and the collector circuit is functionally similar to the contacts 15 of FIG. 6. A limiting resistor 26 is arranged in series with the transistor base 25, and a bias resistor 27 is preferably interposed as shown. Of course, polarity between the transistor 22 and the windings 10 and 17, and the polarity of the applied voltage, must be such as to assure correct operation which is as follows:

The induced voltage in winding 17, as before, follows the curve shown in FIG. 5. The design of the transistor is such that at all voltages above, say, line 20 (the "drop out" voltage in the relay arrangement of FIG. 6) the base current is in excess of that which is necessary to saturate the transistor. Hence, at these voltages (during which the movable element of the electromagnet device completes its full stroke and definitely comes to rest) the current path from the emitter 24 to the collector 23 is a short-circuit which cuts out the resistance 11. Thus full voltage is applied to the main winding 10. Thereafter, when the voltage falls below the value 20, the transistor emitter-to-collector resistance increases sufficiently to compel current to flow through the resistance 11, as a result of which the current in the main winding 10 is automatically decreased as planned. The momentary reversal of the voltage induced in the control winding 17 at this time biases the transistor so that the collector circuit is effectively an open circuit and thus does not reestablish any short-circuiting of the resistance 11.

In each case, i.e., whether the switching means is a relay coil or a transistor, the desirable reduction of current as indicated at "C" in FIG. 4 occurs also in the event that the armature or other movable element fails to complete its movement. There is never any stutter or sustained vibration due to a load forcing the armature off its seat, because the armature comes to rest at the spot at which the force developed by the reduced current "C" (i.e., by the reduced ampere-turns value) balances the force tending to unseat the element. With the core at rest, there is no effective voltage induced in the control winding of the auxiliary circuit.

Both systems perform best with a pure direct-current source of energizing voltage. However, some ripple can be tolerated provided that the secondary (induced) ripple in the control winding 17 lies below the "drop-out" value of the relay or the bias level of the transistor. If desired, ripple effects can be minimized by shunting a small filtering capacitor across the winding 17.

The advantages of the improved control circuit can be summarized as follows:

(1) Even taking into consideration the added space required for a secondary winding (17) it is possible to subject a device of given size to smaller temperature rises, or to employ a smaller device, for a given temperature rise.

(2) Similarly, a device of given size can perform more work, or a smaller device can be employed, for a specified amount of work.

(3) All the disadvantages of armature-actuated switching arrangements are avoided, including an avoidance of overheating, fluttering, and all the shortcomings and possible operational unreliability of mechanically actuated switches.

(4) All the benefits of reduced holding current, after seating of the armature, are retained.

(5) The maximum rate of operation of D.-C. solenoids can be extended substantially.

(6) Operating response and travel time of solenoid can be reduced considerably.

Referring to FIG. 8, a circuit is shown including a signaling device arranged to be energized when the solenoid armature comes to rest. The circuit shown is identical to the circuit of FIG. 6 with the following additions: Another relay coil 30 is provided which when energized closes normally-open switches 31 and 31'; additional switches 14' and 14'' are provided for actuation by the relay coil 16, switch 14' being normally open and switch 14'' being normally closed; and a signaling device 32 and a main switch 35 are provided. When the main switch 35 is closed, the relay coil 16 will be energized as described above with respect to FIG. 6. As a result, switch 14' closes, energizing relay coil 30, and switch 14'' opens. Upon energization of coil 30, switch 31 closes completing a self-holding circuit for the coil 30, and switch 31' closes, but the signal 32 is not energized since switch 14'' is open. When the armature comes to rest thus deenergizing coil 16, switch 14'' closes completing the circuit for energizing the signal 32. Although the switch 14' opens at this point, the coil 30 remains energized by means of its self-holding circuit. When the switch 35 is opened, the coil 30 is deenergized and the circuit is reset.

What is claimed is:

1. In an electric circuit for controlling the operation of an electromagnetic device comprising a main winding and an armature forming part of the flux path and movable, upon magnetization of the device, from one position to another, the reluctance of the flux path being altered during the course of said movement: A source of constant D.C. voltage, a resistor connected in series with said main winding across said voltage source, a control winding inductively coupled with said main winding, a current being induced in said control winding upon connection of said source to said main winding, a short-circuiting by-pass for said resistor, and means in said by-pass responsive to flow of said induced current in said control winding for rendering said by-pass conductive thereby short-circuiting said resistor and allowing increased current from said source to flow through said main winding, said means being adapted to render said by-pass nonconductive after said armature comes to rest in order to permit only a reduced current to flow from said source through said main winding.

2. A circuit as defined in claim 1, said responsive means including a switch having relatively movable contacts actuated by a relay coil, the relay coil being in series with said control winding.

3. A circuit as defined in claim 1, said responsive means including a transistor having an emitter circuit, a collector circuit, and a base circuit, one of said transistor circuits being in series with said control winding.

4. A circuit as defined in claim 1, including a signal, and additional means responsive to current flow in said control winding for energizing a signal when the armature comes to rest.

5. A circuit as defined in claim 2, including a rectifier in the relay coil circuit to allow energization of the relay coil only by current flow in one direction.

References Cited by the Examiner

UNITED STATES PATENTS

| 1,817,431 | 8/31 | Anderson | 317—155.5 |
| 2,313,973 | 3/43 | Sorenson | 317—155.5 |
| 3,018,419 | 1/62 | Bonn | 317—155.5 X |

FOREIGN PATENTS 1,171,637  10/58  France.

OTHER REFERENCES

Brown et al.: Transistors: A New Class of Relays, Control Engineering, December 1956, pages 70, 71.

SAMUEL BERNSTEIN, *Primary Examiner.*